United States Patent
Chinchar et al.

(10) Patent No.: US 6,675,178 B1
(45) Date of Patent: Jan. 6, 2004

(54) METHOD AND SYSTEM FOR ENHANCING A COMMERCIAL TRANSACTION CONDUCTED VIA A COMMUNICATIONS NETWORK

(75) Inventors: Robert S. Chinchar, Oakdale, PA (US); Kirk Francis, Toronto (CA); Doug Grimm, Bay Village, OH (US); Arnold Z. Huffman, Chicago, IL (US); Ray Kling, Olmstead Township, OH (US); Richard R. Krahn, North Lake Elmo, MN (US); Kirk A. Miller, Encino, CA (US); Todd D. Schwarzinger, Cleveland, OH (US); Barry Smiach, Independence, OH (US); Michael S. Sweeney, Parma Heights, OH (US)

(73) Assignee: Accenture LLP, Chicago, IL (US)

( * ) Notice: Subject to any disclaimer, the term of this patent is extended or adjusted under 35 U.S.C. 154(b) by 474 days.

(21) Appl. No.: 09/709,990

(22) Filed: Nov. 9, 2000

(51) Int. Cl.⁷ .............................................. G06F 17/30
(52) U.S. Cl. ...................................................... 707/201
(58) Field of Search ......................... 707/201, 202–203; 705/25, 26

(56) References Cited

U.S. PATENT DOCUMENTS

| | | | |
|---|---|---|---|
| 5,893,076 A | 4/1999 | Hafner et al. | 705/28 |
| 5,933,837 A | 8/1999 | Kung | 707/201 |
| 6,014,669 A * | 1/2000 | Slaughter et al. | 707/10 |
| 6,115,690 A | 9/2000 | Wong | 705/7 |
| 6,138,911 A * | 10/2000 | Fredregill et al. | 235/383 |
| 6,141,006 A | 10/2000 | Knowlton et al. | 345/335 |
| 6,202,149 B1 * | 3/2001 | Hedegard | 713/100 |
| 6,334,178 B1 * | 12/2001 | Cannon et al. | 712/28 |
| 6,356,919 B1 * | 3/2002 | Shah et al. | 707/204 |

* cited by examiner

Primary Examiner—Jack M. Choules
(74) Attorney, Agent, or Firm—Brinks Hofer Gilson & Lione (57) ABSTRACT

A method for enhancing a commercial transaction via a communications network includes maintaining synchronized updates to databases at different business entities to facilitate accurate transactions between the business entities. A change in configuration data stored in a first configuration database is detected in accordance with a real-time detection procedure. Revision data is transmitted to a second configuration database within a maximum time interval after detection of the change in the configuration data. A second configuration database is updated in accordance with the revision data, such that the configuration data of the first configuration database mirrors configuration data of the second configuration database with respect to at least one commercial transaction.

23 Claims, 5 Drawing Sheets

METHOD AND SYSTEM FOR ENHANCING A COMMERCIAL TRANSACTION CONDUCTED VIA A COMMUNICATIONS NETWORK

FIELD OF THE INVENTION

This invention relates to a method and system for enhancing a commercial transaction conducted via a communications network.

BACKGROUND OF THE INVENTION

A communications network allows business entities to conduct commercial transactions through electronic communications. For example, electronic communications may facilitate the exchange of information about goods and/or services of a commercial transaction. The Internet represents an example of the communications network.

Under one technique for conducting a commercial transaction, the business entities electronically exchange all necessary information to conduct a transaction as if no previous transactions had been completed between the two business entities. However, this technique may consume greater bandwidth or resources than desired in transmissions over the communications network between business entities. Consequently, the business entities may experience greater expenses than desired for telecommunications services to transmit all of the necessary information for each transaction.

Under another technique for conducting a commercial transaction, the business entities only electronically exchange minimal information that is most relevant to a current transaction. The business entities may manually reference supplemental records from previous transactions to fill gaps or missing information in the minimal information. For example, the workers at a business entity may reference supplemental records on a preferred shipper or method of shipment. The integrity and organization of the supplemental records may vary with the effectiveness of the manual record-keeping procedures and internal process controls of the business entities. If the supplemental records are outdated, improperly maintained, or if one transacting party changes a transactional parameter in the supplemental records without informing the other party, the execution of the transaction may not be satisfactory to both parties. As the volume of commercial transactions increases, workers' manual referencing of supplemental records may become more awkward and error prone. Thus, a need exists for reducing the amount of data transmitted between the business entities to conduct a transaction, while preserving the integrity and accuracy of the transactional data underlying each transaction.

In a business-to-business electronic commerce environment, data integrity is paramount for the timely and accurate execution of business transactions among business entities in a supply or distribution chain. A distribution chain may include a manufacturer, a distributor, and a retailer, where the retailer is downstream from the manufacturer. Where a supply or distribution chain of business entities are electronically linked together, a data error in an upstream business entity may have a cascading effect upon the business of one or more downstream business entities. Accordingly, if one noncompliant business entity in the chain does not maintain adequate data integrity, other business entities in the chain may be reluctant to conduct electronic transactions with the noncompliant business entity. Other business entities in the chain may seek to block the flow of corrupt or inaccurate data from the noncompliant business entity. The walled-off, noncompliant business entity is placed at distinct disadvantage over competitors that automatically exchange data over electronic communications to facilitate business transactions. Thus, a need exists for maintaining data integrity for electronic transactions among multiple business entities.

SUMMARY OF THE INVENTION

In accordance with one aspect of the invention, a method or system for enhancing a commercial transaction via a communications network includes synchronized updates to configuration databases associated with different business entities. The synchronized updates facilitate accurate transactions between the business entities. A change or update in configuration data stored in a first configuration database is detected in accordance with a real-time detection procedure. Revision data is transmitted to a second configuration database within a maximum time interval after detection of the change in the configuration data of the first configuration database. A second configuration database is updated in accordance with the revision data such that the configuration data of the second configuration database mirrors or generally tracks the configuration of the first configuration database for application to one or more commercial transactions.

In accordance with a second aspect of the invention, a method or system enhances a commercial transaction via a communications network to facilitate the accurate execution of a commercial transaction. The configuration data of a second configuration database is changed to track a revision to the configuration data of a first configuration database, or vice versa, within a maximum interval after the revision. In one example, transactional data for execution of a transaction is sent from a first processing system to a second processing system. The first processing system is affiliated with the first configuration database. The second processing system is affiliated with a second configuration database. In the second configuration database, the configuration data is referenced. The referenced configuration data is associated with the sent transactional data. The characteristics of the transaction are determined based on a combination of the sent transactional data and the referenced configuration data. Accordingly, the method and system are well-suited for promoting efficient use of the communications resources of a communications network interposed between the first processing system and the second processing system.

DETAILED DESCRIPTION OF THE PREFERRED EMBODIMENTS

Figure 1:
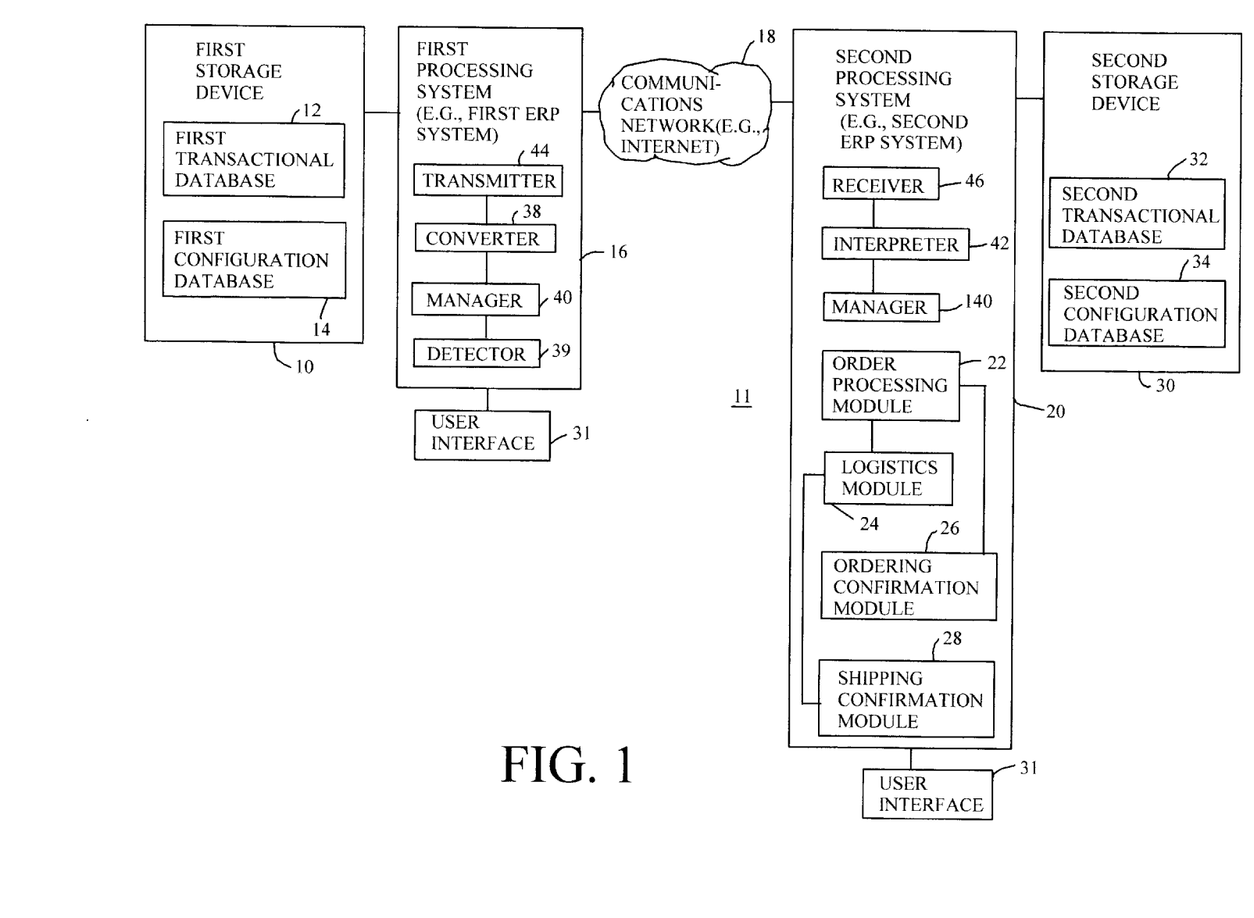
FIG. 1 is a block diagram of a system for enhancing a commercial transaction facilitated via a communications network in accordance with the invention.

In accordance with the invention, FIG. 1 shows a system 11 for enhancing a commercial transaction via a communications network 18. The system 11 includes a first storage device 10 coupled to a first processing system 16. In turn, the first processing system 16 is arranged to communicate with a second processing system 20 via a communications network 18, such as the Internet. The second processing system 20 is coupled to a second storage device 30. User interfaces 31 may be coupled to the first processing system 16 and the second processing system 20 to facilitate data retrieval, viewing, modification, or any other appropriate data treatment.

The first processing system 16 and the first storage device 10 may be affiliated with a first business entity, whereas the second processing system 20 and the second storage device 30 may be affiliated with a second business entity. The first business entity and the second business entity may have or may establish a business relationship. For example, the first business entity and the second business entity may be trading partners, in which the first business entity represents a customer and the second business entity represents a supplier of a product, good, or service to the customer. Although the system 11, as shown in FIG. 1, only supports a first business entity interacting with a second business entity, the system 11 and method of the invention are applicable to transactions among many different business entities or trading partners that access the communications network 18.

The first processing system 16 generally includes a computer or a data processor coupled to memory via a databus. In one embodiment, the first processing system 16 is programmed with software and equipped with electronics hardware to provide a detector 39, a manager 40, a converter 38, and a transmitter 44. The second processing system 20 generally includes a computer or a data processor coupled to memory via a databus. In one embodiment, the second processing system 20 is programmed with software and equipped with electronics hardware to provide a receiver 46, an interpreter 42, and a manager 140. The communications network 18 refers to the Internet, an intranet, a public switched telephone network (PSTN), or any other communications infrastructure for conveying circuit switched traffic, routed data packets, or other telecommunications traffic. In a preferred embodiment, the first processing system 16 and the second processing system 20 communicate in real-time via data packets over the Internet as the communications network 18. Real-time means without humanly observable delay that is apparent or perceptible to users participating in and completing a communication between the first processing system 16 and the second processing system 20.

The first processing system 16 stores and retrieves data from the first storage device 10. The first storage device 10 may comprise a hard-disk drive, a magnetic tape drive, an optical storage device, a magnetic storage device, nonvolatile memory, electronic memory, or any other suitable device for writing, storing, and retrieving digital data. The second processing system 20 stores and retrieves data from the second storage device 30. The second storage device 30 may comprise a hard-disk drive, a magnetic tape drive, an optical storage device, a magnetic storage device, nonvolatile memory, electronic memory, or any other suitable device for writing, storing, and retrieving digital data. The first storage device 10 and the second storage device 30 meet or exceed a minimum storage capacity requirement commensurate with the volume of transactions conducted between the first processing system 16 and the second processing system 20.

The first storage device 10 may store the first transactional database 12 and the first configuration database 14. The second storage device 30 may store the second transactional database 32 and the second configuration database 34. The first transactional database 12 and the second transactional database 32 contain transactional data, whereas the first configuration database 14 and the second configuration database 34 contain configuration data.

The manager 40 of the first processing system 16 interacts with the first storage device 10 and the converter 38. The converter 38 interacts with the transmitter 44. In FIG. 1, the lines that interconnect the manager 40, the converter 38, and the transmitter 44 may represent logical relationships between software instructions, physical electrical interconnections, or both.

The detector 39 detects whether a change in the configuration data in the first configuration database 14 has occurred in a real-time manner. If the detector 39 detects the change in the configuration data, the manager 40 or the first processing system 16 determines update instructions and any associated revision data for transmission to the second processing system 20.

The manager 40 communicates with the first transactional database 12, the first configuration database 14, or both. The manager 40 manages data storage and retrieval for the first transactional database 12 and the first configuration database 14. For example, the manager 40 may retrieve data from the first transactional database 12, the first configuration database 14, or both for input to the converter 38.

The converter 38 converts transactional data, revision data and update instructions (for configuration data) into a standard data format (e.g., extensible mark-up language) prior to transmission via the transmitter 44 over the communications network 18 to the second processing system 20. The standard data format refers to at least one extensible mark-up language (XML) file, at least one hypertext mark-up language file (HMTL), any suitable textual file, or any suitable binary data structure. An XML file conforms to a set of guidelines or rules for the organization of data such that the XML file may be interpreted in an unambiguous way using standard processing conventions. The transmitter 44 may packetize the standard data format into asynchronous transfer mode data packets, internet protocol data packets, or other data packets for transmission via the communications network 18.

The receiver 46 interacts with the transmitter 44 via the communications network 18. The receiver 46 provides input data to the interpreter 42. In turn, the interpreter 42 interacts with the manager 140. In FIG. 1, the lines that interconnect the receiver 46, the interpreter 42, and the manager 140 may represent logical relationships between software instructions, physical electrical interconnections, or both.

The receiver 46 receives data transmitted by the transmitter 44 over the communications network 18. The transmitter 44 and the receiver 46 may each represent a portion of a bidirectional communications interface, such as a modem or a transceiver. The modem may be used to communicate over a public switched telephone connection to the Internet. The receiver 46 provides decoded or depacketized data in the standard data format. The interpreter 42 accepts the standard data format (e.g., XML document) as an input and provides an output as a data structure compatible with the second storage device 30 or other components of the second processing system 20. The manager 140 manages data storage and retrieval of the second transactional database 32 and the second configuration database 34.

As shown in FIG. 1, the second processing system 20 includes various modules (22, 24, 26, and 28) for processing a transaction received from the first processing system 16, where the first business entity acts as a customer and the second business entity acts as supplier. Although not shown, the first processing system 16 may include identical modules to those of the second processing system 20 where the first business entity acts as a supplier and the second business entity acts as a customer. The modules shown in FIG. 1 may be omitted or replaced with other modules if the relationship differs from a customer-supplier relationship.

In FIG. 1, the second processing system 20 includes an order processing module 22, a logistics module 24, an order confirming module 26, and a shipping confirmation module 28. The foregoing modules may be implemented by software instructions of the second processing system 20.

The order processing module 22 accesses the second transactional database 32 and the second configuration database 34 to make decisions regarding the processing of orders in accordance with a transaction communicated over the communications network 18. The transaction is defined by a combination of received transactional data at the second processing system 20 and referenced configuration data from the second configuration database 34. An order processing decision may include whether to accept or reject a purchase order communicated as a proposed transaction. The order processing module 22 may review the applicable configuration data and the transactional data for the proposed transaction to check conformance to a contract or applicable terms between the parties. The order processing module 22 may store or reference applicable terms or the contractual requirements. If the configuration data or the transactional data does not comply with the terms or contractual requirements, the order processing module 22 may reject a purchase order.

The logistics module 24 accesses the second transactional database 32, the second configuration database 34, or both to make logistic decisions regarding the fulfillment of a proposed or actual transaction. The second transactional database 32 preferably contains information about pending shipments or logistics issues for other transactions other than the present transaction to facilitate aggregation of different transactions into common shipments, where practical. The logistics module 24 may store or refer to reference logistics data on resources available for satisfying logistic issues. Logistic decisions may include when to ship a certain transaction, how to ship a certain transaction, or where to ship a certain transaction. The order confirming module 26 and the shipping confirmation module 28 communicate with the order processing module 22 and the logistics module 24, respectively.

Once an order processing decision has been made, an order confirming module 26 may generate an electronic confirmation or notice for transmission from the second processing system 20 to the first processing system 16 via the communications network 18. Alternatively, the order confirming module 26 may facilitate the distribution of confirmation notices via ordinary mail or a postal service.

Once a logistics decision has been made, a shipping confirmation module 28 may facilitate the distribution of electronic shipping confirmation notices via the communications network 18. Alternately, the shipping configuration module 28 may facilitate the distribution of shipping notices via ordinary mail or a postal service. The electronic ordering confirmation and the electronic shipping confirmation promote integrity of the electronic commerce between the first business entity and the second business entity. The first business entity and the second business entity can rely upon the accuracy and the integrity of the transaction executed in accordance with the invention. The first business entity may be able to abort or change the business transaction if the electronic ordering confirmation, the electronic shipping confirmation or both do not comply with the first business entity's requirements or specifications.

In practice, the first processing system 16 may comprise an enterprise resource planning (ERP) system or a subcomponent thereof. Likewise, the second processing system 20 may comprise an enterprise resource planning system or a subcomponent thereof. If the first processing system 16 and the second processing system 20 represent enterprise resource planning systems, they are designated the first enterprise resource planning system and the second enterprise resource planning system, respectively. An enterprise resource planning system includes software instructions for supporting or managing at least one business activity. An enterprise resource planning system may facilitate sharing of data from different computer systems of a business entity. For example, in the context of a manufacturing corporation, an enterprise resource planning system may integrate engineering, sales, materials management, purchasing, production planning, and accounting functions of the manufacturing corporation.

Now that the system 11 of FIG. 1 has been generally described, a description of transactional data and configuration data will promote a further comprehension of the invention. The transactional data and the configuration data may originate from several different sources. In one example, the user may manually enter transactional data, configuration data, or both from a user interface 31 associated with the first processing system 16. In a second example, the user may manually enter transactional data, configuration data, or both from a user interface 31 associated with the second processing system 20. In a third example, the first processing system 16 represents a first ERP system that automatically generates transactional data, configuration data, or both. In a fourth example, the second processing system 20 represents a second ERP system that automatically generates transactional data, configuration data, or both. Approval of the first business entity, the second business entity, or both may be required prior to allowing updates of the first configuration database 14 and the second configuration database 34 to facilitate maintaining the integrity of the configuration data.

The transactional data generally includes information regarding the sale of a product, the sale of goods, the provision of a service, or a financial transaction via the communications network 18. The transactional data may vary from transaction to transaction, although there is generally no prohibition of duplicative transactions or repetitive transactions. The first transactional database 12 contains transactional data related to one or more transactions between a first business entity and another business entity (e.g., second business entity). The second transactional database 32 stores transactional data related to one or more transactions between a second business entity and another business entity (e.g., the first business entity).

The transactional data for each transaction may include transactional parameters, a transactional identifier, a party identifier, or any combination of the foregoing items. The transactional parameters include characteristics of the transaction. For example, in the context of a sale of a product, the transactional parameters may include a product identifier, a price of the product, and quantity of the product in accordance with the transaction.

The first configuration database 14 and the second configuration database 34 store configuration data. The configuration data supplements the transactional data transmitted over the communications network 18 to provide the necessary or requisite information for executing an accurate and timely business transaction between the first business entity and the second business entity. Configuration data represents relatively static or semi-static data affiliated with a transaction. Static data may remain constant for a particular business entity or party regardless of changes in transactional data from transaction to transaction. For example, the configuration data may include an address of a party to a transaction, an account number of a party to a transaction, the presence or absence of credit arrangements, billing addresses, shipping addresses, preferred shippers for certain destination addresses, or any other information that the party establishes and designates as potentially or actually applicable to more than one transaction.

The configuration data stored in the second configuration database 34 mirrors or generally tracks the configuration data stored in the first configuration database 14, or vice versa. Transaction-relevant configuration data refers to at least a portion of configuration data, within the first configuration database 14 or the second configuration database 34, that is applicable to particular transaction or group of transactions. The method and system of the invention promotes the equivalence of transaction-relevant configuration data within the first configuration database 14 and the second configuration database 34. The configuration data is updated regularly, periodically, or on an as-needed basis so that the configuration data, in the first configuration database 14 and the second configuration database 34, are identical copies of each other with respect to the same party or parties. In one example, if the first configuration database 14 and the second configuration database 34 are limited to storing configuration data on the first business entity and the second business entity, the entire contents of the first configuration database 14 and the second configuration database 34 are generally equivalent to each other. In another example, if the first configuration database 14 or the second configuration database 34 contains configuration data for multiple parties, the specific configuration data related to the same party or parties is generally equivalent in both the first and second configuration databases (14, 34). Generally equivalent means that the underlying configuration data is the same despite any differences in compression schemes, error control schemes, data format, and storage media between the first storage device 10 and the second storage device 30.

Transactional data is transmitted between the first processing system 16 and the second processing system 20, or vice versa, to initiate or execute a transaction. Configuration data is generally not transmitted between the first processing system 16 and the second processing system 20 for each transaction to avoid the repetitive transmission of duplicative configuration data. Instead, configuration data may be transmitted between the first processing system 16 and the second processing system 20 on an as-needed basis or otherwise after configuration data has been unilaterally changed by one business entity.

Figure 2:
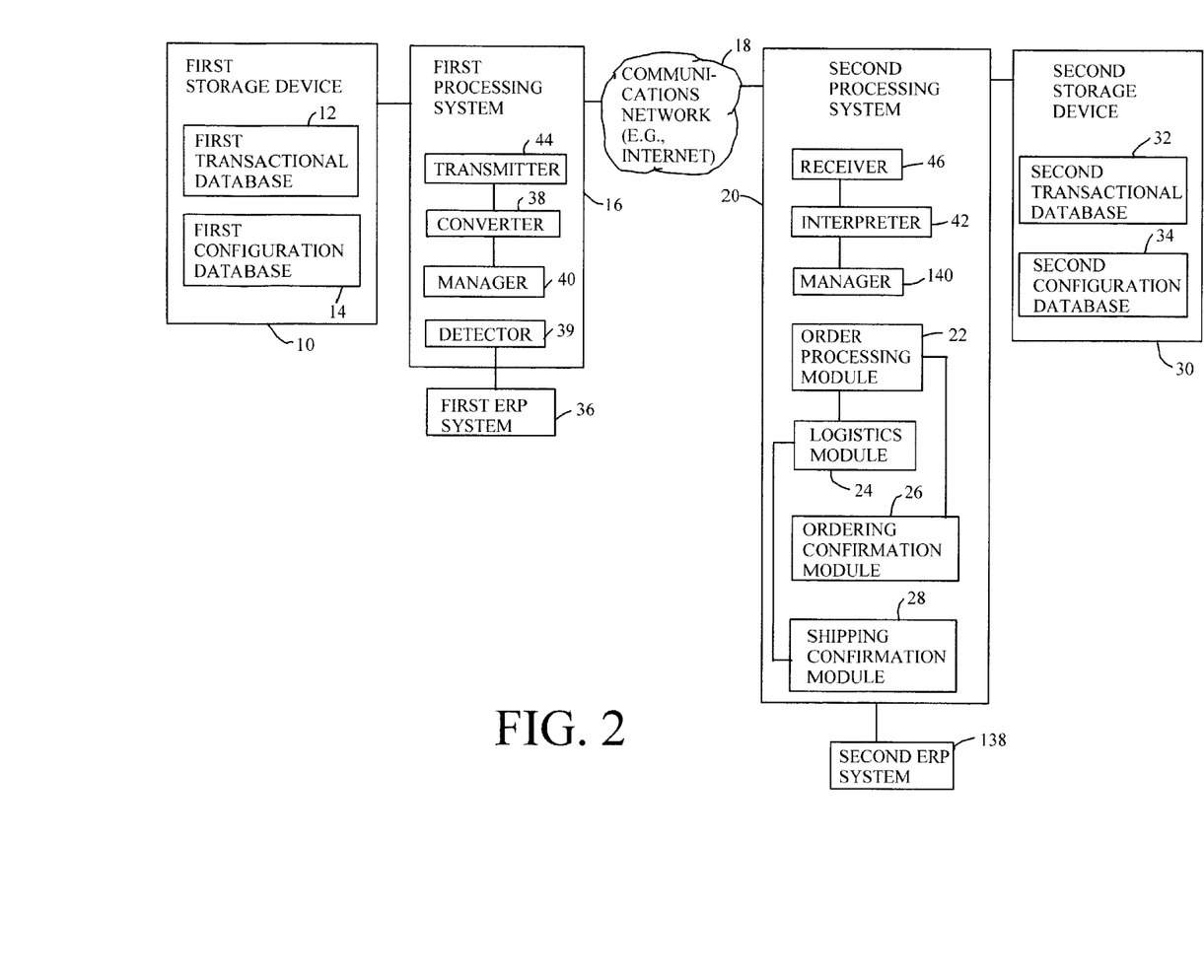
FIG. 2 is a block diagram of an alternate embodiment of a system for enhancing a commercial transaction in accordance with the invention.

FIG. 2 shows another system for enhancing a commercial transaction which is similar to that of FIG. 1, except the first processing system 16 and the second processing system 20 of FIG. 2 are coupled to a first ERP system 36 and a second ERP system 138, respectively. Like reference numbers in FIG. 1 and FIG. 2 indicate like elements.

The first ERP system 36 and the second ERP system 138 represent one or more sources of transactional data, configuration data, or both. The first ERP system 36 may provide transactional data for storage in the first transactional database 12. The second ERP system 138 may provide transactional data for storage in the second transactional database 32. The first ERP system 36 may provide configuration data for storage in the first configuration database 14. The second ERP system 138 may provide configuration data for storage in the second configuration database 34.

The first ERP system 36 is capable of communicating to a second ERP system 138 via the first processing system 16, the communications network 18 (e.g. the Internet), and the second processing system 20 to exchange business information. The first ERP system 36 may be affiliated with the first business entity, whereas the second ERP system 138 may be affiliated with a second business entity. If the first and second business entities are trading partners that exchange goods and/or services, the electronic communications between the first ERP system 36 and the second ERP system 138 may enhance the efficiency of transactions or reduce transactional costs by providing the exchange of the transactional data, the configuration data, or both. For example, the first ERP system 36 may have data that the second business entity could use to provide goods and or services that meet demands, time constraints, or goals, which would not otherwise be known to the second business entity or its ERP system without access to the first ERP system 36.

Figure 3:
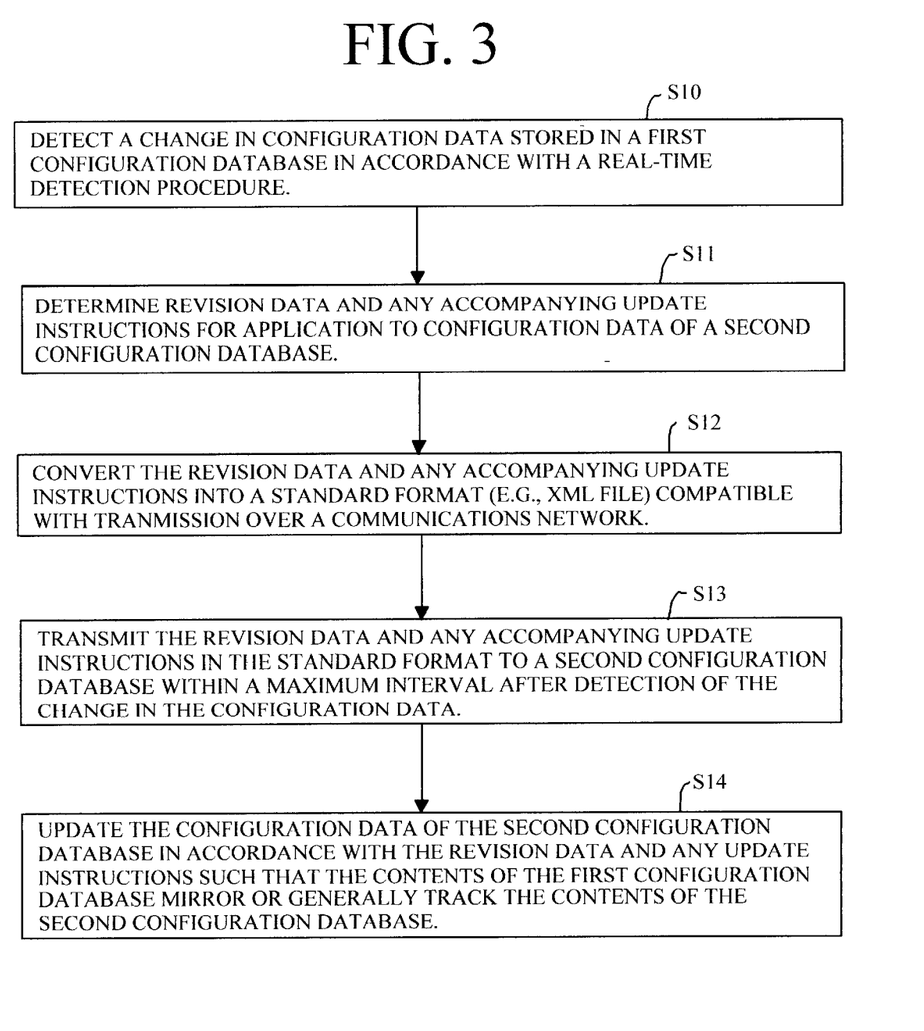
FIG. 3 is a flow chart of a method for enhancing a commercial transaction facilitated via the communications network in accordance with the invention.

In FIG. 3, a method for enhancing a commercial transaction via a communications network 18 facilitates the synchronization of data updates of the first configuration database 14 and the second configuration database 34. Accordingly, business entities may enter into accurate commercial transactions assisted by electronic communications. The method of FIG. 3 begins with step S10.

In step S10, the first processing system 16 detects a change in configuration data stored in a first configuration database 14 in accordance with a real-time detection procedure. A real-time detection procedure includes any mechanism that is capable of detecting of a change in configuration data within a time interval after the change in the configuration data such that the time interval is imperceptible to a user at the user interface 31 or the parties to a transaction. Accordingly, for a real-time detection procedure, the proposed transaction or the transaction that takes place between the first processing system 16 and the second processing system 20 preferably is not disrupted or provided with inaccurate information.

In accordance with one example of a real-time detection procedure, the first processing system 16 detects a change in the configuration data in the first configuration database 14 by detecting an entry of a user command for updating the first configuration database 14. The user command may originate from the user interface 31 coupled to the first processing system 16 or an ERP system (e.g., first ERP system 36).

In accordance with another example of a real-time detection procedure, the first processing system 16 detects a change in the configuration data by detecting the entry of a save file command to save a file of the configuration data within the first configuration database 14. A change or revision in the configuration data includes changing at least a portion of the configuration data, the deletion of at least a portion of the configuration data, or the addition of a portion of the configuration data to a configuration database (e.g., the first configuration database 14 or the second configuration database 34).

After step S10 in step S11, the first processing system 16 determines revision data and any accompanying update instructions for applying the revision data to the configuration data of the second configuration database 34. The revised configuration data and any accompanying update instructions are based upon the latest change in the configuration data stored in the first configuration database 14. Accordingly, the entry of a user command or a save file command may be used as a trigger to flag the latest change in the applicable configuration data in the first configuration database 14 for subsequent reference.

In step S11, the first processing system 16 may reference the flagged data to define revision data any accompanying update instructions. The update instructions may represent the storage location for placement of revision data in the second configuration database 34 or other information, such as the update command that is necessary to delete, add, or change a particular entry or record within the second configuration database 34 to retain identity (i.e. equivalent contents for the same transactional parties) with the first configuration database 14.

After step S11 in step S12, in the first processing system 16, a converter 38 converts the revision data and any accompanying update instructions into a standard format (e.g., XML file). The converter 38 may be implemented by appropriate software instructions that run on the first processing system 16. The transmitter 44 accepts the standard format and places the standard format in a suitable physical form that is compatible with the communications network 18 and a receiver 46 of the second processing system 20. For example, the transmitter 44 may organize the standard format into data packets or a pulse code modulation transmission (e.g., asynchronous transfer mode data packets).

In step S13 following step S12, the first processing system 16 transmits the converted revision data and any accompanying update instructions to a second configuration database 34 for revision of the configuration data at the second configuration database 34 within a maximum interval after detection of the change in the configuration data in step S10 at the first configuration database 14.

The maximum time interval may be set or established in accordance with several alternative techniques. In accordance with a first technique, the maximum time interval includes at least any time necessary to determine the update instructions and the revised configuration data for transmission over a communications network 18 as data packets (e.g., asynchronous transfer mode data packets).

In accordance with a second technique, the maximum time interval includes time necessary to establish a virtual or actual communications link between the first processing system 16 and the second processing system 20 over the communications network 18. For example, the maximum time interval may include the time for accessing the Internet via an Internet service provider (ISP) over a dial-up modem connection. In a preferred embodiment, if the first processing system 16 and the second processing system 20 are interconnected by the Internet, the first processing system 16 and the second processing system 20 have continuous access to the Internet that does not require the use of a dial-up modem. For example, the first processing system 16 and the second processing system 20 may access the Internet through a digital subscriber line or a DS-1 line, which is active most or all of the time.

In accordance with a third technique, the maximum time interval may be set equal to or less some fixed time period (e.g., fifteen seconds). For example, the fixed time period may be of a sufficient duration for (1) the determination of the revision data and any accompanying update instructions and (2) the transmission of the revision data and any accompanying update instructions.

In one embodiment, the accuracy of the second configuration database 34 and its synchronization with the first configuration database 14 may be fostered by adjusting the maximum time interval. If the peak volume of transactions per unit time increases, the first and second processing systems (16, 20) may shorten the maximum time interval to reduce the chance of inaccurate configuration data in the second configuration database 34, where the second configuration database 34 is updated based on the first configuration database 14. The first processing system 16 and second processing system 20 may be able to shorten the maximum time interval if the maximum capacity of the virtual link or physical link through the communications network 18 so permits.

In an alternate embodiment, the accuracy of the second configuration database 34 and its synchronization with the first configuration database 14 may be fostered by flagging data transmitted during a maximum time interval, rather than adjusting the maximum time interval. The transactional data transmitted during the maximum time interval may be flagged with a reference flag indicating a proposed transaction is required to reference the second configuration database 34 prior to execution of the proposed transaction and after an expiration of the maximum time interval. The reference flag procedure promotes the maintenance of accuracy of the configuration data in the second configuration database 34.

In step S14 following step S13, the second processing system 20 updates the second configuration database 34 in accordance with the revision data and any accompanying update instructions. After interpretation by the interpreter 42, the second processing system 20 and the second storage device 30 may execute the update instructions. The update instructions and the revised configuration data are received over the communications network 18 from the transmission of the first processing system 16 in step S13.

The second processing system 20 updates the second configuration database 34 such that the configuration data of the second configuration database 34 identically mirrors or generally tracks the configuration data of the first configuration database 14 with respect to one or more commercial transactions. Identically mirror means that the contents of the first configuration database 14 and the contents of the second configuration database 34 are preferably identical copies of one another with respect to the same group of parties to a transaction except when an update procedure is being performed or has not yet been performed.

Further, in a preferred embodiment, the contents of the first configuration database 14 are generally equivalent to the corresponding contents of the second configuration database 34 with respect to a specified party, regardless of the particular transaction or other parties to the transaction. If a party identifier in the first configuration database 14 matches a party identifier in a second configuration database 34, the contents associated with one of the matching party identifiers is said to be corresponding contents. The term, specified party, may refer to the first business entity, the second business entity, or any other party to a transaction.

Although the foregoing procedure was described as updating the second configuration database 34 such that the second configuration database 34 tracks the contents of the first configuration database 14, the updates may be conducted such that the first configuration database 14 tracks changes in the second configuration database 34 in a similar manner to that described above. To this end, the roles of the first processing system 16 and the second processing system 20 may be reversed from the roles described in conjunction with FIG. 3.

Figure 4:
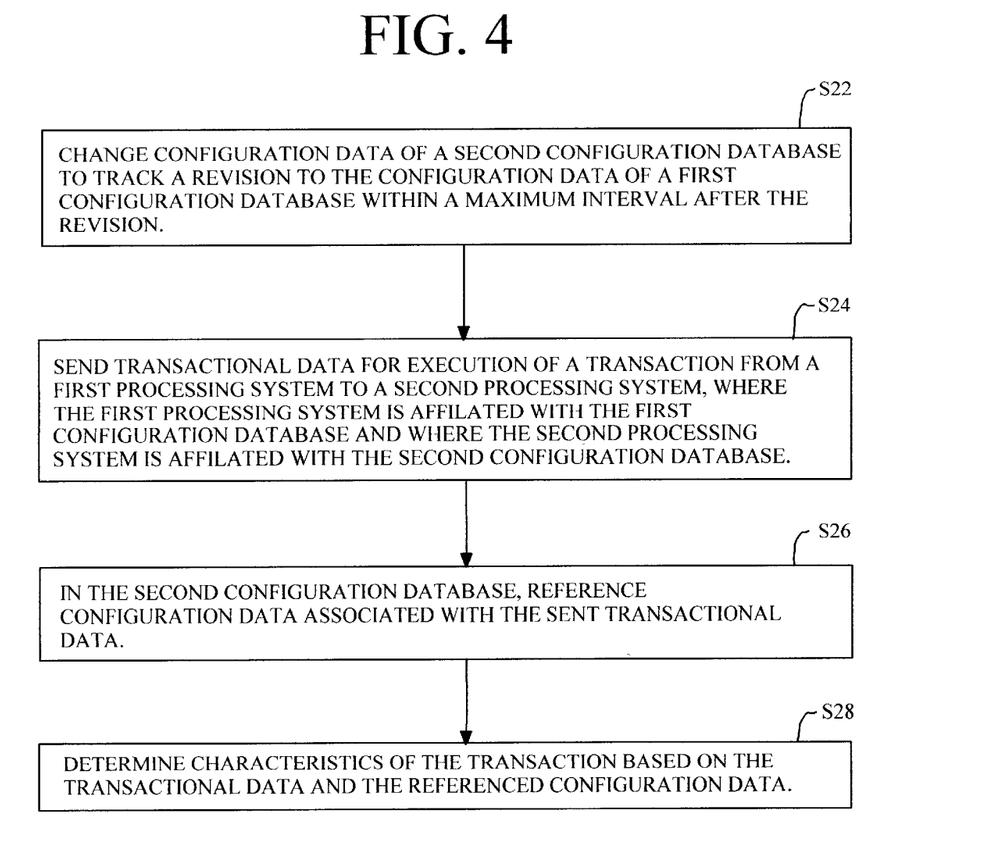
FIG. 4 is a flowchart of a method for conducting a commercial transaction via a communications network in accordance with the invention.

In FIG. 4, a method for conducting a transaction over a communications network 18 in accordance with the invention is presented. The method of FIG. 4 starts in step S22.

In step S22, the second processing system 20 changes configuration data of a second configuration database 34 to track a revision to the configuration data of a first configuration database 14 within a maximum time interval after the revision. The revision includes an addition, deletion, or change in the configuration data of the first configuration database 14, which the second configuration database 34 tracks, or vice versa. The maximum time interval after the revision to the first configuration database 14 may be anytime less than or equal to approximately fifteen seconds after the detection of a revision or another technique consistent with the procedure of FIG. 2.

The changing of the configuration data of step S22 allows the first processing system 16 and the second processing system 20 to reduce the amount of repetitive data transmitted over the communications network 18 that might otherwise be required to conduct one or more transactions. The data transmitted between the first processing system 16 and the second processing system 20 is reduced by the amount of configuration data that is referenced at the second configuration database 34 without repetitive transmissions from the first processing system 16 to the second processing system 20 over the communications network 18. Revision data and update instructions are merely transmitted between the first processing system 16 and the second processing system 20 to configuration data, which represents a core set of data that may be applicable to many transactions.

In step S24 after step S22 the first processing system 16 may send transactional data for execution of a transaction between the first processing system 16 to the second processing system 20. The transactional data may relate to the exchange of goods, services, or the conduction of a financial transaction, for example. The first processing system 16 is affiliated with the first configuration database 14. The second processing system 20 is affiliated with the second configuration database 34. The first processing system 16 may store and retrieve information in the first configuration database 14, whereas the second processing system 20 may store and retrieve information from the second configuration database 34.

In step S24, the configuration data is not transmitted for each transaction. Rather, revision data is only transmitted when necessary to update the configuration data to assure that the second configuration database 34 adequately mirrors or tracks the first configuration database 14, or vice versa. Thus, the communications between the first processing system 16 and the second processing system 20 minimize the transmission of data packets by synchronously updating the first configuration database 14 and the second configuration database 34 as a pair.

Further, because the data in the first configuration database 14 and the second configuration database 34 are synchronously updated, the execution of a business decision to engage in a transaction is not distorted or corrupted. Instead, the business decision and the associated transaction are accurately executed because the first configuration database 14 and the second configuration database 34 have accurate contents that mirror one another at the time of initiation of the transaction.

In step S26, the configuration data in the second configuration database 34 is referenced based on its association with the sent transactional data. In FIG. 4, the sent transactional data refers to the data that is sent in step S24 from the first processing system 16 to the second processing system 20. The referenced configuration data is configuration data that is extracted from the second configuration database 34.

Step S26 may include an information extraction procedure to extract the appropriate configuration data from the second configuration database 34. For example, the information may be extracted from the second configuration database 34 by referring to at least a party identifier that is transmitted in the sent transactional data from the first processing system 16. Further, the information may be extracted from the second configuration database 34 based on a transactional identifier transmitted in the transactional data. The transactional identifier or party identifier in the received transactional data is matched with a corresponding transactional identifier, party identifier or both in the second configuration database 34 to retrieve the appropriately referenced configuration data from the second configuration database 34.

In step S28, the second processing system 20 determines relevant characteristics of the transaction based on the received transactional data from the first processing system 16 and the referenced or extracted configuration data in the second configuration database 34. The second processing system 20 groups or combines the transactional data and the configuration data that refer to the same transaction together by referencing the party identifier, the transactional identifier, or both in the applicable data. For example, if the transactional data and the configuration data have corresponding party identifiers that match, the transactional data and the configuration data associated with the matching party identifiers are grouped together to form a cohesive set of characteristics for the transaction. Further, if the transactional data and the configuration data have corresponding transactional identifiers that match, the transactional data and the configuration data associated with the matching party identifiers are grouped together to form a cohesive set of characteristics for the transaction. In this way, the second processing system 20 reconstructs the characteristics of a transaction, while facilitating reduced communications traffic between the first processing system 10 and the second processing system 20.

After step S28, the second processing system 20 may make an order processing decision about the transaction based on the characteristics of the transaction. The characteristics of the transaction are available from the proper combination of received transactional data and extracted configuration data. Further, the second processing system 20 may transmit order confirmations about the transaction based on the order processing decision. In accordance with another aspect to step S28 the second processing system 20 may make a logistic decision about the transaction based on the characteristics of the transaction. Further, the second processing system 20 may transmit an electronic shipping confirmation about the transaction based on the order processing decision.

Figure 5:
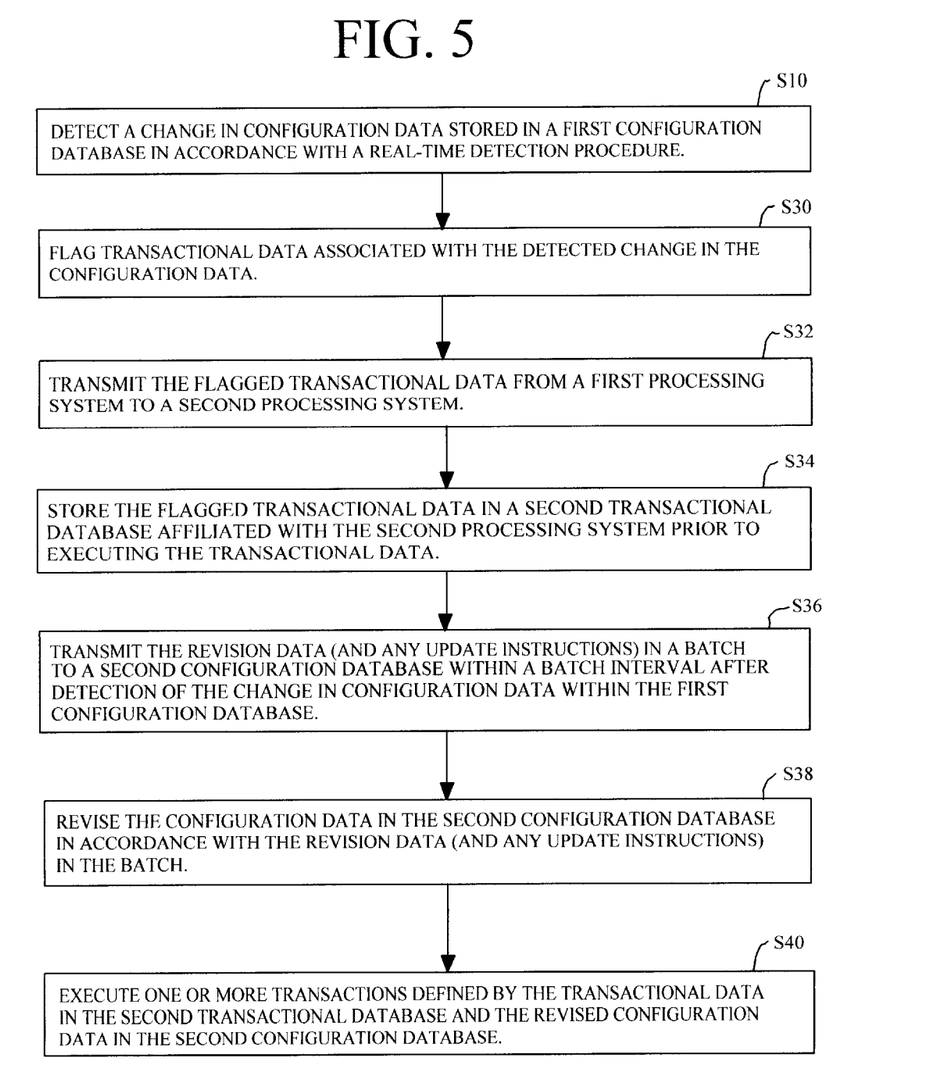
FIG. 5 is a flow chart of another method for conducting a commercial transaction via a communications network in accordance with the invention.

FIG. 5 illustrates a flow chart of an alternate method for enhancing an electronic transaction in accordance with the invention. The method of FIG. 5 uses a batch transmission technique for the transmission of update instructions and revision data from the first processing system 16 to the second processing system 20. In contrast, the method of FIG. 3 uses an ongoing or real-time transmission technique for the transmission of any update instructions and revision data from the first processing system 16 to the second processing system 20.

In step S10, the first processing system 10 detects a change in configuration data stored in a first configuration database 14 in accordance with a real-time detection procedure. Step S10 of FIG. 5 may be executed in the same manner set forth for step S10 of FIG. 3.

After step S10 in step S30, the first processing system 16 flags transactional data associated with the detected change in the configuration data. The transactional data may be flagged as it is entered into the user interface 31 or afterwards, for example. Flagged transactional data refers to associating a marker or flag with the transactional data to indicate a defined prospective treatment of the transactional data. For example, the second processing system 20 may be instructed to interpret the flag as an command to wait until the validity of the corresponding configuration data is established prior to executing the transactional data.

In step S32, the first processing system 16 transmits the flagged transactional data from a first processing system 16 to a second processing system 20. The second processing system 20 receives the flagged transactional data.

In step S34, the second processing system 20 stores or holds the flagged transactional data in a second transactional database 32 affiliated with the second processing system 20 prior to executing the transactional data.

In step S36, the first processing system 16 transmits the revision data (and any update instructions) in a batch to a second configuration database 34 within a batch interval after detection of the change in configuration data within the first configuration database 14. The transmitter 44 or the first processing system 16 may hold the revision data and accompanying update instructions in a buffer memory for subsequent transmission that complies with a batch interval. The batch interval may represent the expiration of a fixed period of time, the filling of a queue in the buffer memory, a minimum number of updates or revisions to the configuration data, or the like. For example, the first processing system 16 may send a batch transmission of update instructions and revision data for the second configuration database 34 on a weekly basis after the expiration of a week, as the fixed period of time.

In step S38, the second processing system 20 updates the configuration data in the second configuration database 34 in accordance with the revision data and any update instructions in the batch.

After step S38 in step S40, the second processing system 20 executes one or more transactions defined by the transactional data in the second transactional database 32 and the revised configuration data in the second configuration database 34. The second processing system 20 retrieves the held transactional data for unexecuted transactions from the second transactional database 32. The unexecuted transactions may be executed individually or as a group by referencing the updated or revised configuration data (from step S38) in the second configuration database 34.

The first business entity, the second business entity, or any additional business entity following the system method of the invention may readily obtain configuration data through an automated procedure that reduces the time and error associated with human intervention in business transactions. The method and system of the invention facilitates the sharing of transactional data and configuration data among two or more trading partners to a business transaction. The sharing of data ensures the seamless or steady flow of business processes associated with a business transaction. The method and system is well-suited for executing business transactions in real-time without bottlenecks that might otherwise result from human intervention in the business transactions.

The method and system supports the automated synchronization of configuration data among at least a first business entity and a second business entity. The method and system may support the automated synchronization of configuration data among many business entities affiliated with a supply or distribution chain to avoid inaccuracies or discrepancies in the configuration data that might otherwise disrupt one or more business transactions. Further, reliance and faith in the electronic-commerce business transaction is promoted by promoting the accurate exchange of configuration data among business entities.

The foregoing description of the method and system describes several illustrative examples of the invention. Modifications, alternative arrangements, and variations of these illustrative examples are possible and may fall within the scope of the invention. Accordingly, the following claims should be accorded the reasonably broadest interpretation, which is consistent with the specification disclosed herein and not unduly limited by aspects of the preferred embodiments disclosed herein.

The following is claimed:

1. A method for enhancing a commercial transaction via a communications network, the method comprising the steps of:

detecting a change in configuration data stored in a first configuration database in accordance with a real-time detection procedure, wherein the detecting step comprises detecting an entry of a save file command to save a file of the configuration data within the first configuration database;

transmitting revision data to a second configuration database within a maximum interval after detection of the change in the configuration data; and updating a second configuration database in accordance with the revision data such that the configuration data of the first configuration database generally mirrors configuration data of the second configuration database with respect to at least one commercial transaction.

2. The method according to claim 1 wherein the transmitting step includes transmitting update instructions associated with the revision data and wherein the updating step revises the second configuration database according to the update instructions and the revision data.

3. The method according to claim 1 wherein the detecting step comprises detecting an entry of a user command for updating the first configuration database.

4. The method according to claim 1 wherein the change, in the configuration data of the first configuration database, includes deleting a portion of the configuration data.

5. The method according to claim 1 wherein the change, in the configuration data of the first configuration database, includes adding additional configuration data to supplement the existing configuration data.

6. A method for enhancing a commercial transaction via a communications network, the method comprising the steps of:

detecting a change in configuration data stored in a first configuration database in accordance with a real-time detection procedure;

transmitting revision data to a second configuration database within a maximum interval after detection of the change in the configuration data, wherein the transmitting step comprises establishing the maximum time interval as including at least a time necessary to packetize the revision data and any accompanying update instructions for transmission over a communications network as data packets; and updating a second configuration database in accordance with the revision data such that the configuration data of the first configuration database generally mirrors configuration data of the second configuration database with respect to at least one commercial transaction.

7. A method for enhancing a commercial transaction via a communications network, the method comprising the steps of:
   detecting a change in configuration data stored in a first configuration database in accordance with a real-time detection procedure;
   transmitting revision data to a second configuration database within a maximum interval after detection of the change in the configuration data, wherein the transmitting step comprises establishing the maximum time interval as equal to or less than approximately fifteen second; and
   updating a second configuration database in accordance with the revision data such that the configuration data of the first configuration database generally mirrors configuration data of the second configuration database with respect to at least one commercial transaction.

8. A method for enhancing a commercial transaction via a communications network, the method comprising the steps of:
   detecting a change in configuration data stored in a first configuration database in accordance with a real-time detection procedure;
   transmitting revision data to a second configuration database within a maximum interval after detection of the change in the configuration data; and
   updating a second configuration database in accordance with the revision data such that the configuration data of the fast configuration database generally mirrors configuration data of the second configuration database with respect to at least one commercial transaction; wherein
      transactional data transmitted during the maximum time interval is flagged with a reference flag indicating a proposed transaction is required to reference the second configuration database prior to execution of the proposed transaction and after an expiration of the maximum time interval.

9. A method for conducting a commercial transaction via a communications network, the method comprising the steps of:
   changing configuration data of a second configuration database to track a revision to the configuration data of a first configuration database with a maximum interval after the revision;
   sending transactional data for execution of a transaction from a first processing system to a second processing system, where the first processing system is affiliated with the first configuration database and where the second processing system is affiliated with the second configuration database;
   referencing configuration data, in the second configuration database, associated with the sent transactional data; and
   determining characteristics of the transaction based on the transactional data and referenced configuration data.

10. The method according to claim 9 wherein the changing step comprises tracking a deletion as the revision to the configuration data.

11. The method according to claim 9 wherein the changing step comprises tracking an addition of additional configuration data as the revision to the existing configuration data.

12. The method according to claim 9 wherein sending of the transactional data includes sending transactional characteristics on the price and quantity of a product.

13. The method according to claim 9 wherein the sending of the transactional data includes sending information on a financial transaction.

14. The method according to claim 9 wherein the referencing of the configuration data includes reading an identifier in the transactional data to facilitate retrieval of configuration data associated with the identifier within the second configuration database.

15. The method according to claim 9 wherein the determining step comprises:
   making an order processing decision about the transaction based on accessing and retrieving configuration data from the second configuration database.

16. The method according to claim 15 wherein the determining step comprises:
   transmitting order confirmation about the transaction based on the order processing decision.

17. The method according to claim 9 wherein the determining step comprises:
   making logistics decision about the transaction based on accessing and retrieving configuration data from the second configuration database.

18. The method according to claim 17 wherein the determining step comprises:
   transmitting shipping confirmations about the transaction based on a order processing decision.

19. A system for enhancing a commercial transaction via a communications network, the system comprising:
   a detector for detecting a change in configuration data stored in a first configuration database in accordance with a real-time decision procedure, wherein the detector is adapted to detect an entry of a save file command to save a file of the configuration data within the first configuration database;
   a transmitter for transmitting revision data to a second configuration database within a maximum interval after detection of the change in the configuration data; and
   a processing system for updating a second configuration database in accordance with the revision data such that transaction-relevant configuration data of the first configuration database generally mirrors transaction-relevant configuration data of the second configuration database with respect to at least the commercial transaction.

20. The system according to claim 19 wherein the transmitter transmits update instructions associated with the revision data and wherein the processing system revises the second configuration database according to the transmitted update instructions.

21. The system according to claim 19 wherein the detector is adapted to detect an entry of a user command for updating the first configuration database.

22. A system for enhancing a commercial transaction via a communications network, the system comprising:
   a detector for detecting a change in configuration data stored in a first configuration database in accordance with a real-time decision procedure;
   a transmitter for transmitting revision data to a second configuration database within a maximum interval after detection of the change in the configuration data, wherein the maximum time interval includes at least a time necessary to packetize the revision data and any accompanying update instructions for transmission over a communications network as data packets; and a processing system for updating a second configuration database in accordance with the revision data such that transaction-relevant configuration data of the first configuration database generally mirrors transaction-relevant configuration data of the second configuration database with respect to at least the commercial transaction.

23. A system for enhancing a commercial transaction via a communications network, the system comprising:

a detector for detecting a change in configuration data stored in a first configuration database in accordance with a real-time decision procedure;

a transmitter for transmitting revision data to a second configuration database within a maximum interval after detection of the change in the configuration data; and a processing system for updating a second configuration database in accordance with the revision data such that transaction-relevant configuration data of the first configuration database generally mirrors transaction-relevant configuration data of the second configuration database with respect to at least the commercial transaction, wherein transactional data transmitted during the maximum time interval is flagged with a reference flag indicating a proposed transaction is required to reference the second configuration database prior to execution of the proposed transaction and after an expiration of the maximum time interval.

* * * * *

UNITED STATES PATENT AND TRADEMARK OFFICE
CERTIFICATE OF CORRECTION

PATENT NO.   : 6,675,178 B1
DATED        : January 6, 2004
INVENTOR(S)  : Robert S. Chinchar et al.

It is certified that error appears in the above-identified patent and that said Letters Patent is hereby corrected as shown below:

<u>Column 15,</u>
Line 33, please delete "fast" and insert -- first --.

Signed and Sealed this

Sixth Day of April, 2004

JON W. DUDAS
*Acting Director of the United States Patent and Trademark Office*